UNITED STATES PATENT OFFICE.

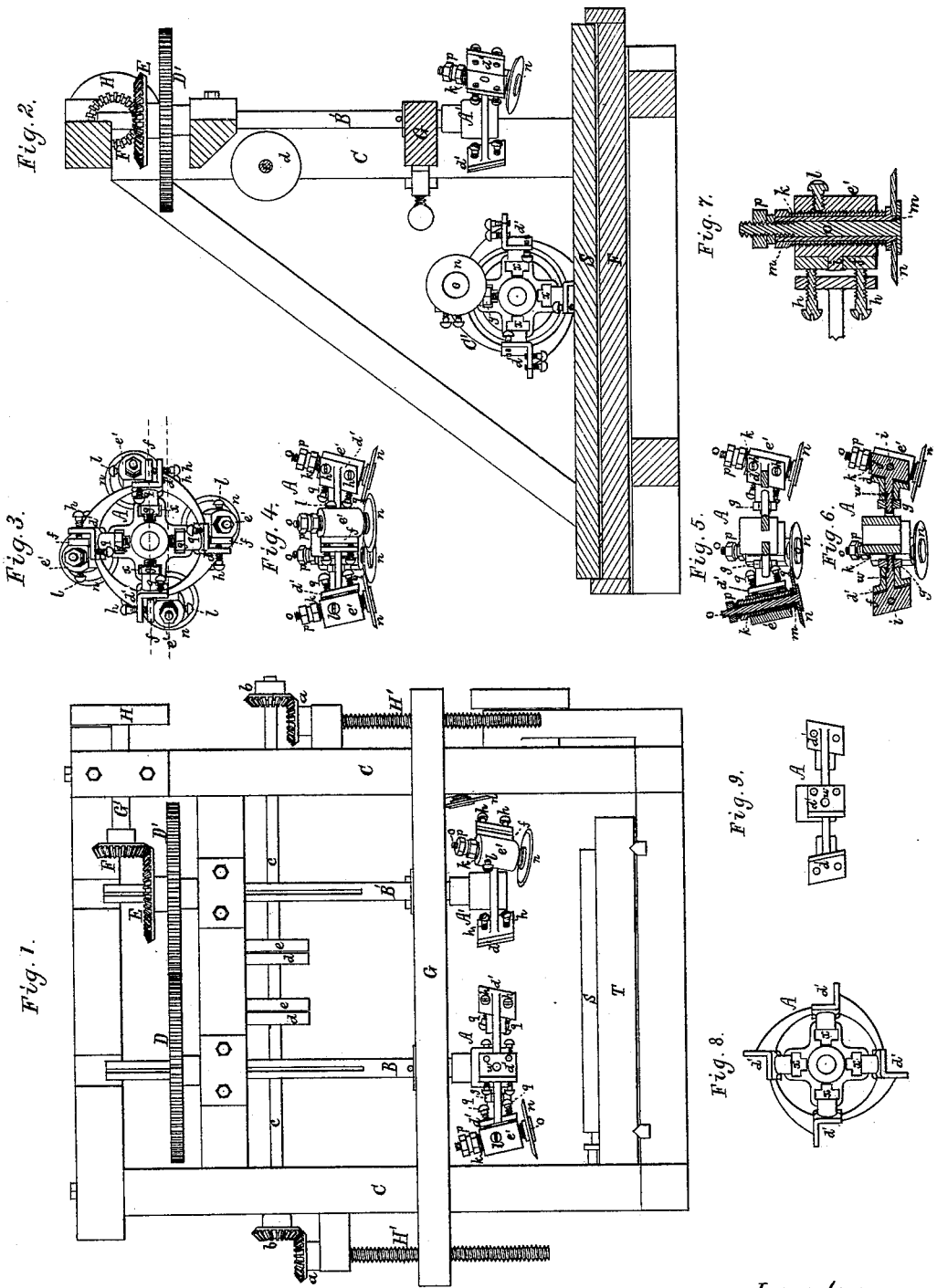

ALEXANDER McDONALD, OF BELMONT, MASSACHUSETTS.

IMPROVEMENT IN MACHINES FOR DRESSING AND CUTTING STONE.

Specification forming part of Letters Patent No. 222,194, dated December 2, 1879; application filed October 9, 1879.

*To all whom it may concern:*

Be it known that I, ALEXANDER McDONALD, of Belmont, of the county of Middlesex and State of Massachusetts, have invented a new and useful Improvement in Machinery for Cutting or Dressing Stone; and I do hereby declare the same to be described in the following specification and represented in the accompanying drawings, of which—

Figure 1 is a front elevation, and Fig. 2 a transverse section, of a machine embodying my invention. Fig. 3 is a top view of one of its rotary cutter-carriers and the cutters thereof, Fig. 4 being a front elevation, and Figs. 5 and 6 transverse sections, of it, the plane of section of Fig. 5 being through the holding-bolt of one of the rotary cutting-disks or cutters, while the plane of section in Fig. 6 is through the rocker to which the cutter-head is pivoted. Fig. 7 is a vertical section through a cutter, its head, rocker, and the adjustments of the latter.

The nature of my invention is defined in the claim or claims hereinafter presented.

My improvements relate to that class of stone cutting or dressing machines in which rotary disks are used as cutters, the improvements having reference to means or mechanism for adjusting each rotary disk to its proper vertical position and dip or inclination to the stone to be cut by it.

In the drawings, A A' denote the cutter-carriers, each of which, at its center, is fixed to the lower end of one of two vertical shafts, B B', supported by and adapted to revolve in a frame, C, and a horizontal bar, G, adapted to move vertically in the frame. At or near their upper ends the shafts have applied to them, by "feather-connections" or splines, two gears, D D', of like size, such gears engaging with each other and being supported by the frame C. Above one of such gears, and applied to one of the shafts B B', as is the gear below, is a bevel-gear, E, that engages with a bevel-pinion, F, fixed on a shaft, G', carrying a driving-pulley, H, such shaft being duly applied to the frame C, to which the bar G is to be applied, so as to be capable of moving vertically and carrying with it the shafts B B'.

The bar G is supported by adjusting-screws H' H', sustained by the frame C or suitable devices appurtenant thereto. The screws screw into and through the bar G, and at their upper ends they are provided with bevel-gears $a$ $a$, to engage with other bevel-gears, $b$ $b$, fixed on a horizontal shaft, $c$, arranged in the frame C, and provided with two sets of fast and loose pulleys, $d$ $e$. Each of such sets is to be furnished with an endless belt running from a common driving-drum, one of such belts being a crossed belt. These belts are to cause the shaft $c$ to be revolved in opposite directions, as occasion may require, to effect either the raising or depressing of the sets of cutters relatively to a stone when it is under them.

Each cutter-carrier (which without its cutters is shown in top view in Fig. 8 and in side view in Fig. 9) has at its periphery a series of angular recesses or notched abutments, $d'$, as represented, they being disposed at equal distances apart.

To each abutment there is adapted a cutter-head, $e'$, and its rocker $f$. The latter is a flat-headed screw-bolt, whose shank extends into a socket, $w$, made radially in the cutter-carrier, the shank being held in place in the socket by a nut, $g$, arranged in an opening, $x$, as shown, and screwed on the shank. The abutment is provided with adjusting-screws $h$ $h$, to screw against the head of the rocker to adjust it and hold it adjusted to an inclination to the horizon. The cutter-head $e'$, at its middle, is pivoted to the head of the rocker, the pivot being shown at $i$. There is screwed into the cutter-head a tubular box or bearing, $k$, the said cutter-head being furnished with a set-screw, $l$, to work against the bearing to prevent it from accidentally revolving. Within the tubular box is a shouldered tube or sleeve, $m$, through which and the disk-cutter $n$ a screw-bolt, $o$, passes, as shown, the cutter being between the head of the bolt and that of the sleeve. A nut, $p$, is screwed on the bolt and against the shoulder thereof, at the upper end of the screw. Furthermore, the abutment is provided with a second set of adjusting-screws, $q$ $q$, arranged to stand in a plane at right angles with that of the other set, and to bear against the cutter-head, so as to incline it to the horizon in a plane at right angles with that in which it may be moved by the screws $h$ $h$.

From the above it will be seen that each cutter, by means of the bolt and nut, becomes fastened to the sleeve, and with such is to freely revolve, the sleeve turning in the tubular box k, which, by screwing into the cutter-head, can be used to adjust the cutter in the line of the axis of the bolt. This adjustment is to bring the cutter to its proper position relatively to that or those next it in the set for all of them to cut in one horizontal plane. As the cutters may not wear exactly alike, or one may wear down a little faster than the others, this adjustment of each becomes essential to the production of good work. By means of the two sets of adjusting-screws the dip of the cutter can also be changed in either of two planes at right angles, as described.

The above-specified means of applying each cutter to its carrier not only admit of each cutter freely revolving on its own axis while forced against a stone while the cutter-carrier is in rapid revolution, but to be adjusted in dip or inclination and outwardly relatively to its fellow cutters, so as to cut the stone to the best advantage in a horizontal plane.

To the frame C, I apply another revolving cutter-carrier, as shown at C', and provide it with cutters and adjusting appliances like those hereinbefore described, and also with means of revolving it, such cutter-carrier being arranged so as to cut or dress a stone on its edge or side while it is being dressed on its top, or before or after such. With this cutter and the others, and in the frame C, I employ two carriages or platforms, S T, one to move rectilinearly on the other toward and from the side cutter-head. The stone is to rest on the upper carriage, the lower carriage being to move in a direction at right angles to its fellow, in order to move the stone along for it to be dressed or cut by all the cutters, or only by those which cut it on its top, or by those which reduce it on its side. These platforms may have suitable mechanism for adjusting them so as to adapt the stone to the cutters to be cut by them; and the lower of such carriages or platforms may have mechanism for moving it forward, as may be necessary to cause the stone to be regularly reduced by the cutters.

I claim as my invention in the stone dressing or cutting machine as follows, viz:

1. Each cutter-carrier provided with a series of notched abutments and with radial sockets leading therefrom, as represented, such abutments and sockets being to receive rockers and adjusting-screws arranged in them, as and for purposes as set forth.

2. The combination of the cutter-carrier provided with notched abutments and two sets of adjusting-screws arranged in each of them, as set forth, with a rocker and cutter-head, substantially as explained, applied to each other and to the carrier, and to the two sets of adjusting-screws of the abutment, essentially in manner and to operate as specified, each cutter-head having applied to it a disk-cutter, as represented.

3. The combination of the adjustable box or bearing and the sleeve, screw-bolt, and nut with the cutter-head and the rocker, and with the carrier having screws for adjusting the said cutter-head and rocker, in manner as set forth.

ALEX. McDONALD.

Witnesses:
R. H. EDDY,
W. W. LUNT.